US012476997B2

(12) United States Patent
Atighetchi et al.

(10) Patent No.: US 12,476,997 B2
(45) Date of Patent: *Nov. 18, 2025

(54) SYSTEMS AND METHODS FOR EVALUATING CYBER ASSETS

(71) Applicant: Raytheon BBN Technologies Corp., Cambridge, MA (US)

(72) Inventors: Michael Hassan Atighetchi, Framingham, MA (US); Stephane Yannick Blais, Framingham, MA (US); Katarzyna Lucja Olejnik, Brookline, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/513,768

(22) Filed: Nov. 20, 2023

(65) Prior Publication Data

US 2024/0089286 A1     Mar. 14, 2024

Related U.S. Application Data

(63) Continuation of application No. 16/692,749, filed on Nov. 22, 2019, now Pat. No. 11,831,669.

(60) Provisional application No. 62/805,479, filed on Feb. 14, 2019.

(51) Int. Cl.
*H04L 29/06* (2006.01)
*H04L 9/40* (2022.01)

(52) U.S. Cl.
CPC ......... *H04L 63/1433* (2013.01); *H04L 63/20* (2013.01)

(58) Field of Classification Search
CPC ..................... H04L 63/1433; H04L 63/20
See application file for complete search history.

(56) References Cited

U.S. PATENT DOCUMENTS

| 2014/0337974 | A1* | 11/2014 | Joshi | H04L 63/1425 |
| | | | | 726/23 |
| 2016/0226895 | A1* | 8/2016 | Huang | G06F 21/6254 |
| 2017/0104780 | A1* | 4/2017 | Zaffarano | H04L 63/20 |
| 2019/0349426 | A1* | 11/2019 | Smith | H04L 9/3239 |

OTHER PUBLICATIONS

Musman et al "Evaluating the impact of cyber attacks on missions", Proceedings of the 5th International Conference on Information Warfare and Security (Year: 2010).*
Apache Jena 2019, Apache Jena, <https://jena.apache.org/index.html/> [Online; accessed Aug. 3, 2019].
Atighetchi et al., "Automatic Quantification and Minimization of Attack Surfaces," 27th Annual IEEE Software Technology Conference (STC), Long Beach, CA, Oct. 2015.

(Continued)

*Primary Examiner* — Noura Zoubair
(74) *Attorney, Agent, or Firm* — CANTOR COLBURN LLP

(57) ABSTRACT

Techniques for evaluating cyber assets are disclosed. A system obtains, from data sources in an experimental environment, raw data generated in response to execution of a cyber asset. The system generates, from the raw data, at least one instance model corresponding to the data sources. The at least one instance model includes instances of concepts represented in a cyber impact ontology.

14 Claims, 10 Drawing Sheets

(56) References Cited

OTHER PUBLICATIONS

Atighetchi et al., "Experimentation Support for Cyber Security Evaluations," 2016, Proceedings of the 11th Annual Cyber and Information Security Research Conference (CISRC). ACM, 5.

Atighetchi et al., "Using Ontologies to Quantify Attack Surfaces," Semantic Technology For Intelligence, Defense, and Security (STIDS), Fairfax, VA, Nov. 2016, pp. 10-18.

Attack Surface Reasoning Ontology, The Distributed Systems Technology, BBN Technologies, 2016, <https://ds.bbn.com/projects/asr.html> [Online; accessed Aug. 4, 2019].

Benzel, "The Science of Cyber Security Experimentation: The DETER Project," Proceedings of the 27th Annual Computer Security Applications Conference (ACSAC) ACM, 2011, pp. 137-148.

Berman et al., "GENI: A Federated Testbed for Innovative Network Experiments," Computer Networks 61 (2014), pp. 5-23.

Blasch et al., "High-Level Information Fusion Management and Systems Design," 1st ed. Boston: Artech House, Apr. 2012.

Blasch et al., "Ontology alignment in geographical hard-soft information fusion systems," Information Fusion (FUSION), 2010 13th Conference on, Jul. 2010, pp. 1-8.

Carvalho et al., "A GUI tool for plausible reasoning in the semantic web using MEBN," Seventh International Conference on Intelligent Systems Design and Applications(ISDA). Los Alamitos, CA, USA: IEEE Computer Society, Oct. 2007, pp. 381-386.

Carvalho et al., "PROGNOS: predictive situational awareness with probabilistic ontologies," Proceedings of the Thirteenth International Conference of Information Fusion (FUSION 2010)., Edinburgh, UK, Jul. 2010.

Chun et al., "Planetlab: An Overlay Testbed for Broadcoverage Services," ACM SIGCOMM Computer Communication Review 33, 3 (2003), pp. 3-12.

Costa et al., "A first-order Bayesian tool for probabilistic ontologies," Proceedings of the Twenty-First International Florida Artificial Intelligence Research Society Conference (FLAIRS 2008), Coconut Grove, FL, USA: AAAI Press, May 2008, pp. 631-636.

Costa et al., "High level fusion and predictive situational awareness with probabilistic ontologies," Proceedings of the Thirteenth International Conference of Information Fusion (FUSION 2010)., George Mason University, Fairfax, VA, USA, May 2010. [Online]. Available: <http://c4i.gmu.edu/>events/reviews/2010/abstracts bios.php#p3A.

Costa et al., "High-Level Information Fusion of Cyber-Security Expert Knowledge and Experimental Data," 2018 21st International Conference on Information Fusion (FUSION), 2018, IEEE, pp. 2322-2329.

Costa et al., "PR-OWL: a framework for probabilistic ontologies," Proceedings of the International Conference on Formal Ontology in Information Systems (FOIS 2006), ser. Frontiers in Artificial Intelligence and Applications, B. Bennet and F. Christiane, Eds., vol. 150. Baltimore, MD, USA: IOS Press, Nov. 2006, pp. 237-249. [Online]. Available: <http://www.booksonline.iospress.nl/Content/View.aspx?piid=2210>.

Costa et al., "PROGNOS: Applying Probabilistic Ontologies to distributed predictive situation assessment in naval operations," Proceedings of the Fourteenth International Command and Control Research and Technology Conference. Washington, DC, USA: CCRP Publications, Jun. 2009, best paper award of the Collaborative Technologies for Network-Centric Operations Track. [Online]. Available: <http://www.dodccrp.org/events/>14th iccrts2009/papers/108.pdf.

Costa, "Bayesian semantics for the Semantic Web," PhD Dissertation, George Mason University, Fairfax, VA, USA, Jul. 2005, Brazilian Air Force. [Online]. Available: <http://hdl.handle.net/1920/455>.

Eide, "Toward Replayable Research in Networking and Systems," Position paper presented at Archive '10, the NSF Workshop on Archiving Experiments to Raise Scientific Standards, Salt Lake City, UT, May 2010.

Giugno et al., "P-SHOP(D): A probabilistic extension of SHOQ(D) for probabilistic ontologies in the semantic web," Proceedings of the Eight European Conference on Logics in Artificial Intelligence, S. Flesca, S. Greco, N. Leone, and G. Lanni, Eds., vol. 2424. Cosenza, Italy: Springer LNCS, Sep. 2002, pp. 86-97. [Online]. Available: <http://cat.inist.fr/?aModele=afficheN&cpsidt=14666085>.

Jeter et al., "Semantic Links Across Distributed Heterogeneous Data. In International Symposium on Distributed Computing and Artificial Intelligence," Springer, 2019, pp. 107-115.

Kirillov et al., "Malware attribute enumeration and characterization," MITRE, 2011, pp. 1-22.

Koller et al., "P-Classic: A tractable probabilistic description logic," Proceedings of the National Conference on Artificial Intelligence, 1997, pp. 390-397.

Laskey et al., "Uncertainty reasoning for the world wide web: Report on the URW3-XG incubator group," W3C, URW3-XG, 2008. [Online]. Available: http://ite.gmu.edu/~klaskey/papers/URW3URSW08.pdf.

Laskey, "MEBN: a language for first-order Bayesian knowledge bases," Artificial Intelligence, vol. 172, No. 2-3, pp. 140-178, Feb. 2008. [Online]. Available: <http://portal.acm.org/citation.cfm?id=1327646>.

Lebo et al., "A five-star rating scheme to assess application seamlessness," Semantic Web, vol. 8, No. 1, pp. 43-63, 2017.

Little et al., "Designing ontologies for higher level fusion," Information Fusion, vol. 10, No. 1, pp. 70-82, Jan. 2009. [Online]. Available: <http://www.sciencedirect.com/science/article/pii/S1566253508000377>.

Lyon, Gordon Fyodor, 2009, Nmap Network Scanning: The Official Nmap Project Guide to Network Discovery and Security Scanning. Insecure.

Mann, "An Introduction to the Common Configuration Enumeration," URL: <http://cce>.mitre.org/about/documents.html (2008).

Martin, "Making security measurable and manageable," MILCOM 2008-2008 IEEE Military Communications Conference. IEEE, 2008, pp. 1-9.

McGuinness, "Ontologies for information fusion," Information Fusion, Proceedings of the Sixth International Conference of, vol. 1, 2003, pp. 650-657.

Mell et al., "Common vulnerability scoring system," IEEE Security & Privacy 4, 6 (2006), pp. 85-89.

NMAP 2017, NMAP, <https://nmap.org/> [Online; accessed Nov. 29, 2017].

Nottelmann et al., "Adding probabilities and rules to owl lite subsets based on probabilistic datalog," International Journal of Uncertainty, Fuzziness and Knowledge-Based Systems, vol. 14, pp. 17-42, 2006.

Oo et al., "Analyzing the Effect of Moving Target Defense for a Web System," International Journal of Networking and Computing 9, 2 (2019), pp. 188-200.

Pan et al., "A Bayesian network approach to ontology mapping," The Semantic Web ISWC 2005, ser. Lecture Notes in Computer Science, Y. Gil, E. Motta, V. Benjamins, and M. Musen, Eds. Springer Berlin / Heidelberg, 2005, vol. 3729, pp. 563-577, 10.1007/11574620 41. [Online]. Available: http://dx.doi.org/10.1007/11574620 41 <http://dx.doi.org/10.1007/11574620%2041>.

Pearl, "Probabilistic Reasoning in Intelligent Systems: Networks of Plausible Inference," 1st ed. Morgan Kaufmann, Sep. 1988.

Predoiu et al., "Probabilistic extensions of semantic web languages—A Survey," The Semantic Web for Knowledge and Data Management: Technologies and Practices, Idea Group Inc, 2008.

Snort 2019, Snort, <https://www.snort.org/> [Online; accessed Aug. 3, 2019].

Steinberg et al., "Revisions to the JDL data fusion model," Sensor Fusion: Architectures, Algorithms, and Applications III, B. V. Dasarathy, Ed., vol. 3719. Orlando, FL, USA: SPIE, Mar. 1999, pp. 430-441. [Online]. Available: <http://link.aip.org/link/?PSI/3719/430/1>.

Taylor et al., "Automated effectiveness evaluation of moving target defenses: metrics for missions and attacks," Proceedings of the 2016 ACM Workshop on Moving Target Defense, 2016, ACM, pp. 129-134.

Zaffarano et al., "A Quantitative Framework for Moving Target Defense Effectiveness Evaluation," Proceedings of the Second

(56) References Cited

OTHER PUBLICATIONS

ACM Workshop on Moving Target Defense, ser. MTD'15. New York, NY, USA: ACM, 2015, pp. 3-10. [Online]. Available: <http://doi.acm.org/10.1145/2808475.2808476>.

* cited by examiner

SYSTEMS AND METHODS FOR EVALUATING CYBER ASSETS

CROSS-REFERENCE TO RELATED APPLICATIONS

This application is a Continuation of U.S. patent application Ser. No. 16/692,749, titled "Systems and Methods for Evaluating Cyber Assets," filed Nov. 22, 2019 which claims the benefit of U.S. Provisional Patent Application Ser. No. 62/805,479, titled "Derived and Integrated Cyber Effects (DICE)," filed Feb. 14, 2019, each of which is hereby incorporated by reference.

STATEMENT REGARDING FEDERALLY-SPONSORED RESEARCH OR DEVELOPMENT

This invention was made with government support under Contract No. FA8750-17-C-0209 awarded by the Air Force Research Laboratory (AFRL). The U.S. government has certain rights in this invention.

TECHNICAL FIELD

This application generally relates to cyber assets. In particular, this application relates to systems and methods for evaluating cyber assets with respect to one or more attributes.

BACKGROUND

The cyber domain is an adversarial environment in which rogue agents seek to disrupt, deny, degrade, and/or deceive current missions. From a cyber defense perspective, rogue agents are controlled by adversaries who seek to gain an advantage by accessing the defender's network, and may include individuals, organizations, or governments. Many different attack vectors exist, using techniques that cover a broad spectrum of complexity, size, capabilities, and other factors. The range of attack vectors available makes cyber defense a daunting task. The challenge of mounting an effective cyber defense is further aggravated by the difficulty of obtaining information about the enemy, such as the enemy's capabilities, intentions, and modus operandi. In addition, enhancing the effectiveness of cyber defenses may require understanding how different cyber defenses interact with each other in the face of different attacks.

From a full-spectrum cyber mission perspective, Command and Control (C2) faces a similar problem of selecting a suitable cyber asset to deploy at any given time in the mission cycle, to achieve a mission objective. In addition, a cyber asset may be configured in a manner that seeks to maximize a utility function across one or more attributes. Such attributes may include, for example: accuracy in achieving the intended effect (e.g., deny); the precision at which the effect is obtained (e.g., only intended hosts are denied); latency associated with generating the intended effect; and/or the cyber asset's ability to remain undetected and non-attributable.

Effective C2 in U.S. military, commercial, and other settings is complicated by the fact that cyberspace is a highly dynamic, man-made domain with considerable uncertainty and incomplete data. The data available for estimating network-wide impacts generated by cyber assets is generally heterogenous and uncertain. For example, challenges associated with cyber asset deployment may include rapidly changing networks, unreliable asset effects, and highly non-linear adversarial activities. In general, uncertainty may be present in all aspects of cyber asset quantification, such as the capabilities of the cyber assets themselves and configuration information about nodes, networks, and defenses. Attempting to merge such data and compute its aggregated results is a high-level information fusion (HLIF) problem. In contrast, Low-level Information Fusion (LLIF) combines sensor reports to identify, classify, or track individual objects.

Due to the challenges involved in handling heterogenous, incomplete, and uncertain data, current systems for selecting and configuring cyber assets rely on human subject matter experts (SME's) for most tasks. Prior efforts to offload tasks from human SME's (e.g., Bayesian probability, extensions to description logics, and programming logic alternatives) have suffered from a lack of standardized support for handling uncertainty in the underlying data.

Prior approaches that rely on SME's have also struggled in the face of heterogenous, incomplete, and uncertain data. While it is relatively straightforward to set up well-defined experiments and evaluate cyber assets within those strict parameters, actual target environments encountered in real-world cyber mission execution are not identical to the virtual environments in which those experiments are conducted. Cyber operators generally do not have access to the defense software set up by adversaries, and may have only a limited understanding of the types of defenses and their configurations. In addition, evaluating experimental data as low-level observables does not provide a clear understanding of how these observables relate to aggregate measures at the level of abstraction of interest to cyber planners, such as the probability of mission success, covertness, and non-attribution of operations. Given these many challenges, in many cases, relying on SME's renders the cyber asset planning process too time-consuming and therefore operationally ineffective.

Approaches described in this section have not necessarily been conceived and/or pursued prior to the filing of this application. Accordingly, unless otherwise indicated, approaches described in this section should not be construed as prior art.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1A:
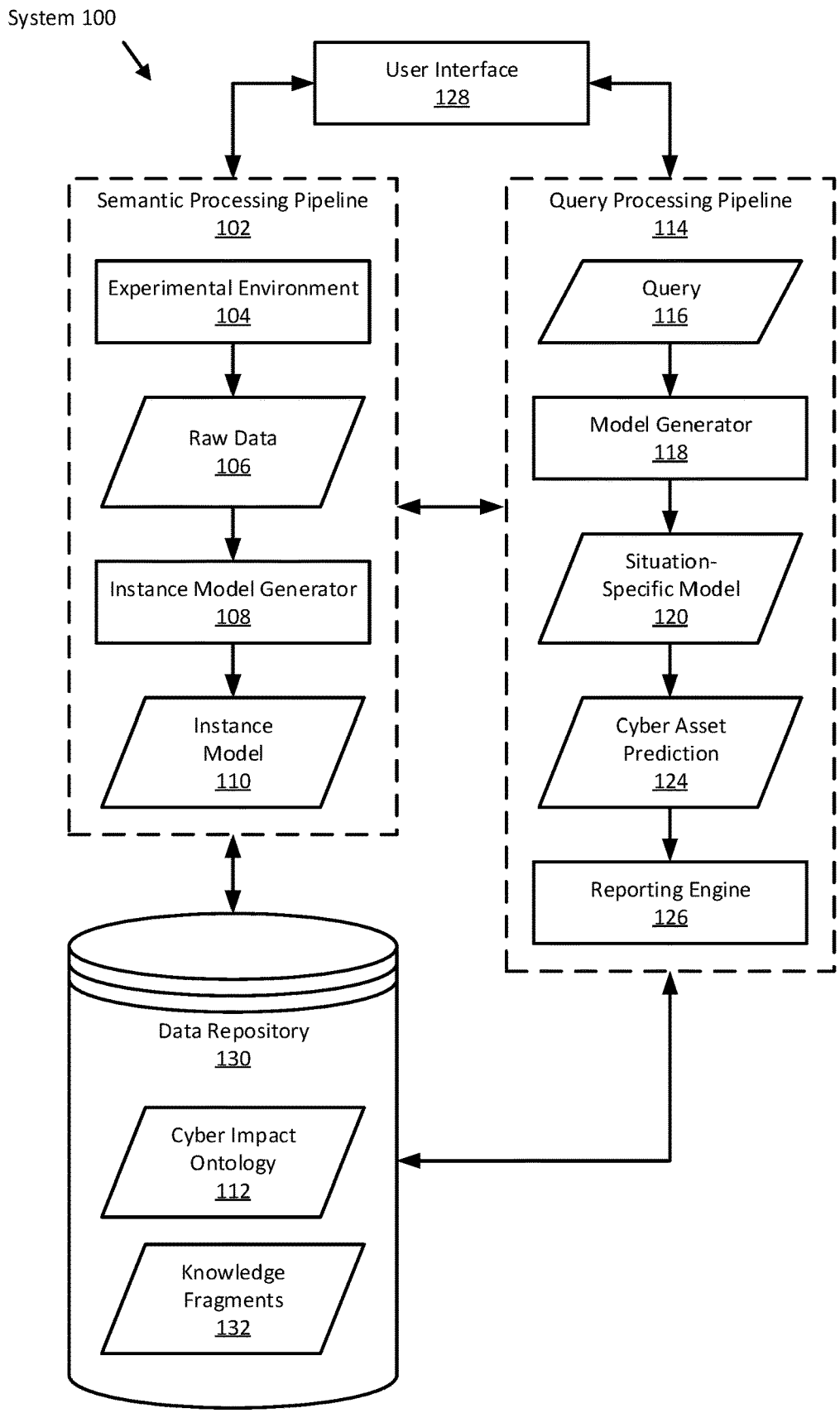
FIG. 1A is a block diagram of an example of a system according to an embodiment.

The following table of contents is provided for the reader's convenience and is not intended to define the limits of the disclosure.

1. GENERAL OVERVIEW
2. SYSTEM ARCHITECTURE
   2.1. SEMANTIC PROCESSING PIPELINE
   2.2. INSTANCE MODEL GENERATOR
   2.3. QUERY PROCESSING PIPELINE
3. EVALUATING A CYBER ASSET
4. DERIVING AN AGGREGATE ATTRIBUTE OF A CYBER ASSET
5. ADDITIONAL EXAMPLES
   5.1. SEMANTIC PROCESSING PIPELINE
   5.2. KNOWLEDGE FRAGMENT
   5.3. SITUATION-SPECIFIC MODELS
6. COMPUTER IMPLEMENTATIONS

1. GENERAL OVERVIEW

An architecture is disclosed that leverages probabilistic ontologies to facilitate and expedite the cyber asset planning process, allowing for automated improvements over time-consuming, error-prone SME-based approaches. One or more embodiments supply a solution to the HLIF problem of effective cyber asset selection, by fusing data from diverse sources (e.g., sensor reports, field knowledge, experimental results, SME reports, analyst assessments, social media, etc.) to characterize a complex situation, draw useful inferences, and support process refinement. One or more embodiments quantify, through a collection of derived attributes that align with cyber mission objectives, how well cyber assets will perform when being deployed in a target environment containing cyber defenses that are under external control. One or more embodiments compute high-level attributes from low-level data in a manner that considers aggregate cross-node impact yet remains explainable, reusable, and maintainable.

In an embodiment, a cyber asset evaluation system obtains raw data from multiple data sources (e.g., a sensor and/or intrusion detection system), in response to execution of a cyber asset in an experimental environment (e.g., a simulation executed in a virtual environment configured to function like a target environment, and/or using one or more experimental components configured to emulate actual or expected components of the test environment). The raw data may include configuration information and/or runtime event information. For example, the raw data may characterize one or more runtime behaviors of a cyber asset being evaluated.

In an embodiment, the system generates, from the raw data, one or more instance models corresponding to the respective data sources. Instance models may take the form of semantic graphs, which may be Resource Description Framework (RDF) graphs or another type of semantic graph. An instance model may include one or more derived aggregate attributes for the cyber asset being evaluated. For example, the derived aggregate attribute(s) may include one or more of a success attribute, an attribution attribute, a collateral damage attribute, a speed attribute, a detectability attribute, and/or an adaptability attribute.

The system may generate, based at least in part on an instance model, a cyber asset prediction corresponding to a predicted outcome of deploying the cyber asset in a target environment. For example, the system may predict a degree to which a range of target locations is observable by the sensors and/or a degree to which a ruleset of sensors allows for detection of the cyber asset.

One or more embodiments described in this Specification and/or recited in the claims may not be included in this General Overview section.

2. SYSTEM ARCHITECTURE

FIG. 1A is a block diagram of an example of a system 100 according to an embodiment. In an embodiment, system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In an embodiment, user interface 128 refers to hardware and/or software configured to facilitate communications between a user and one or more components of system 100. User interface 128 renders user interface elements and receives input via user interface elements. User interface 128 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of user interface 128 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 128 may be specified in one or more other languages, such as Java, Python, Perl, C, C++, and/or any other language or combination thereof.

In an embodiment, user interface 128 is configured to facilitate communications between a user and one or more components of system 100 in order to: manage the process of gathering data in experimental environment 104; access data generated by semantic processing pipeline 102 (e.g., raw data 106 and/or instance model 110); submit a query 116 to query processing pipeline 114; and/or access data generated by query processing pipeline 114 (e.g., situation-specific model 120, and/or cyber asset prediction 124). Various components of system 100 may support many different functions that are accessible and/or configurable via user interface 128. In an embodiment, separate user interfaces (not shown) are used to communicate with different components of system 100, respectively.

2.1. Semantic Processing Pipeline

In an embodiment, semantic processing pipeline 102 refers to a logical pipeline of hardware and/or software components configured to perform operations described herein for generating one or more instance models 110. Examples of operations for generating instance model 110 are described below.

In an embodiment, to generate instance model 110, semantic processing pipeline 102 is configured to use a cyber impact ontology 112. Cyber impact ontology 112 provides a schema for interactions between components of instance model generator 108, described in further detail below. In addition, cyber impact ontology 112 includes a type system that defines, for example, one or more derived attributes, cyber assets, intermediate representations, and/or outputs of semantic processing pipeline 102.

In an embodiment, cyber impact ontology 112 is a probabilistic ontology. A probabilistic ontology is an explicit, formal knowledge representation that expresses knowledge about a domain of application. Knowledge expressed by a probabilistic ontology may include, for example: the types of entities that exist in the domain; properties of those entities; relationships among entities; processes and events that happen with those entities; statistical regularities that characterize the domain; inconclusive, ambiguous, incomplete, unreliable, and/or dissonant knowledge related to entities of the domain; and/or uncertainty about all the above forms of knowledge. In general, a probabilistic ontology may be preferable to a standard ontology because it requires a proper representation of the statistical regularities and the uncertain evidence about entities in the domain of application. As used here, the term "entity" may refer to any concept (real or fictitious, concrete or abstract) that can be described and reasoned about within the domain of application. By providing a principled, structured, sharable formalism for describing knowledge about a domain and the associated uncertainty, a probabilistic ontology may serve as a formal basis for representing and propagating HLIF results in a cyber asset evaluation system. Cyber impact ontology 112 may be generated by one or more SME's and/or automated processes. System 100 may store cyber impact ontology 112 as one or more semantic graphs, e.g., Resource Description Framework (RDF) graphs and/or another type of semantic graph.

In an embodiment, experimental environment 104 refers to hardware and/or software configured to perform operations described herein for obtaining raw data 106 used to generate instance model 110. Experimental environment 104 may include one or more of: a test environment that models a "live" target environment (i.e., an environment that simulates and/or emulates one or more components of the environment being targeted with a cyber asset, using a virtual machine and/or other techniques); the target environment itself; and/or a test environment that does not model a particular target environment but is configured to evaluate the performance of a cyber asset under a particular set of conditions. In an embodiment, experimental environment 104 models a particular network environment, such as an intranet, wide-area network (WAN), virtual private network (VPN), and/or another form of network or combination thereof. One or more components in experimental environment 104 may be configured to read various properties of experimental environment 104 (e.g., properties relating to operation of a cyber asset and/or other components in experimental environment 104) and store those properties as raw data 106. Components that obtain raw data from experimental environment 104 may include one or more sensors (e.g., a packet sniffer and/or an intrusion detection system) and/or one or more other types of components.

Raw data 106 may include many different kinds of information, including but not limited to information about: operating systems; Internet Protocol (IP) addresses; media access control (MAC) addresses; services; ports; numbers of devices; and/or other kinds of information detected in experimental environment 104. Raw data 106 may be stored in many different formats, such as comma-separated value (CSV) files, extensible markup language (XML), and/or another format or combination thereof.

In an embodiment, instance model generator 108 refers to hardware and/or software configured to perform operations described herein for generating instance model 110 based on raw data 106. Instance model 110 may also be based, in part, on human-generated data (not shown). For example, instance model generator 108 may generate instance model 110 based in part on SME reports and/or other forms of human-generated analyses. Semantic processing pipeline 102 may be configured to receive human-generated data as input to user interface 128.

In an embodiment, instance model 110 models abstractions over raw data 106. Specifically, instance model 110 models observations gathered from experiments conducted in experimental environment 104 and/or new knowledge derived from those experiments. As described herein, instance model 110 is based in part on cyber impact ontology 112. Instance model 110 includes instances of concepts (e.g., entities, properties of entities, etc.) represented in cyber impact ontology 112, in which specific values are assigned to variables associated with those concepts. Instance model 110 may include one or more semantic graphs. For example, instance model 110 may include one or more Resource Description Framework (RDF) graphs (e.g., including a set of RDF triples) and/or another type of semantic graph.

In an embodiment, generating instance model 110 facilitates systematic computation of aggregate attributes of cyber assets. Storing knowledge about assets, defenses, target environments, etc. in the form of probabilistic models allows disparate sources of information to be automatically integrated into a rich graph of interconnected information, which may be easy to understand and/or extend. Instance model 110 may support effects reasoning and/or configuration reasoning, described in further detail below.

In an embodiment, instance model 110 supports effects reasoning. Effects reasoning is based on direct observations (e.g., raw data 106) obtained by executing a cyber asset with a specific configuration in experimental environment 104. For example, if the Nmap network scanner is used as a cyber asset, experimental data may provide information such as how many IP addresses were found by an Nmap invocation, how many ports were found, and whether the Nmap cyber asset was able to accurately determine the types of operating systems across the target nodes in the experimental environment 104. System 100 may use this information to calculate the "success" of an Nmap invocation as a measure of accuracy.

In an embodiment, instance model 110 supports configuration reasoning. Configuration reasoning involves analyzing component configurations and making predictions based on comparisons with cyber asset configurations. For example, predicting the likelihood that the Nmap cyber asset will be detected may involve analyzing the configurations of intrusion detection systems with respect to monitoring range and age of policy, both of which will impact the sensors' abilities to detect cyber assets. Configuration information may be an important element of C2, given that cyber missions are often focused on obtaining a detailed situational awareness picture of the target environment in early phases of the mission. Configuration reasoning may help cyber C2 planners plan asset deployments without needing to go through a full experimentation cycle.

2.2. Instance Model Generator

Figure 1B:
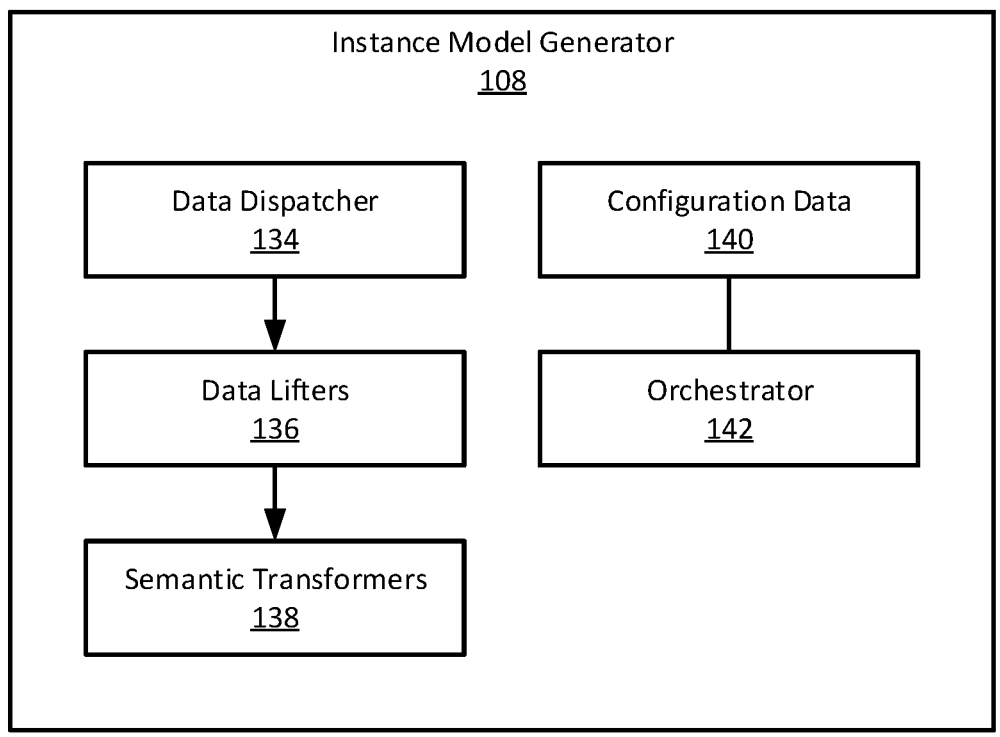
FIG. 1B is a block diagram of an instance model generator according to an embodiment.

FIG. 1B is a block diagram of an example of an instance model generator 108 according to an embodiment. In an embodiment, instance model generator 108 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

In an embodiment, a data dispatcher 134 maps different data lifters 136, described in further detail below, to corresponding regular expressions. Specifically, the regular expressions correspond to system locations (e.g., file names, network paths, uniform resource identifiers (URI's), host names, and/or any other kind of location identifier) that store raw data 106 of different types. When the location (e.g., file name) of a particular item of raw data 106 matches a regular expression, data dispatcher 134 dispatches that item of raw data 106 (e.g., file) to the corresponding data lifter 136.

In an embodiment, data lifters 136 transform raw data 106 into semantic representations. For example, data lifters 136 may transform raw data 106 into RDF triples. The specific format of output to be generated by data lifters 136 may be specified in cyber impact ontology 112. Instance model generator 108 may use different data lifters 136 for different formats of raw data 106. For example, instance model generator 108 may use different data lifters 136 for different input file formats. Data lifters 136 may maintain provenance information in an RDF triple. For example, given a particular input file, a data lifter 136 may generate a "computedFromFile" triple that references the path of the input file. Data lifters 136 may store the resulting semantic representations in a triple store.

In an embodiment, semantic transformers 138 are configured to generate instance model 110, based on the output of the data lifters 136. Specifically, semantic transformers 138 are configured to generate instance model 110 as one or more connected semantic graphs with extracted knowledge about the cyber asset under examination. Instance model generator 108 may be configured to invoke semantic transformers 138 once all data lifters 136 have completed their operations. Semantic transformers 138 may use SPARQL Protocol and RDF Query Language ("SPARQL") to generate a semantic graph. For example, semantic transformers 138 may include one or more SPARQL SELECT queries, for selecting one or more sets of RDF triples from the triple store. Semantic transformers 138 may further include one or more SPARQL CONSTRUCT queries that define(s) the structure(s) of the resulting RDF graph(s). Semantic transformers 138 may be configured to store instance model 110 as one or more RDF graphs in a triple store. In an embodiment, when semantic transformers 138 have completed their operations, the triple store contains a connected semantic graph with extracted knowledge about the cyber asset under examination. The specific queries and/or format of output to be generated by semantic transformers 138 may be specified in cyber impact ontology 112. One or more embodiments may use techniques other than SPARQL queries and/or RDF triples.

Table 1, below, provides some non-limiting examples of semantic transformers 138 that may be used in the process of evaluating the "Nmap" port scanning tool, along with descriptions of each example semantic transformer 138's contribution(s) to an example instance model (not shown). In this example, semantic transformers 138 with names in italics are not specific to Nmap and may be used to evaluate other cyber assets.

TABLE 1

Examples of Semantic Transformers

| Semantic Transformer Name | Description |
| --- | --- |
| Accuracy | Calculates Nmap scan accuracy as compared to GroundTruth |
| ActuallyObserved | Determines whether the intrusion detection system (IDS) actually detected Nmap |
| ToolConfig | Extracts Nmap configuration parameters |
| Attribution | Computes whether the Nmap scan is attributable back to the source |
| CQFLayout | Maps CQF host unique ID to hosts in the GroundTruth model |
| CollateralDamage | Determines whether any processes were killed |
| DefenseConfig | Extracts IDS configuration parameters |
| DwellCalculation | Time the Nmap scan spent on the network as a whole |
| GroundTruth | Stitches individual host models into one model of the network |
| GroundTruthDiff | Compares the GroundTruth from before and after the Nmap scan |
| IntrusionDetectability | Parses IDS log entries to map to known parameters |
| Latency | Computes the amount of time the Nmap scan took |
| PolicyIntersection | Determines whether the IDS ruleset will allow it to detect Nmap |
| RangeIntersection | Determines IP address overlap between Nmap scan target and IDS monitored range |
| RequiredRules | Determines which rules the IDS must have in order to detect Nmap scan |
| ScanProfile | Parses Nmap configuration parameters to map to known settings |
| Success | Determines whether Nmap was successful based on the percentage of resources discovered correctly |
| TargetHosts | Determines which hosts Nmap was targeting |

In an embodiment, instance model 110 includes one or more derived attributes associated with the cyber asset being evaluated. In general, a derived attribute is an attribute that is not represented directly in raw data 106, but can be derived based on the available data. A derived attribute may a type of attribute that is not readily susceptible to direct measurement using sensors. In an embodiment, a derived attribute is an aggregate attribute that is based on multiple sets of information (e.g., multiple sources of raw data 106). The following paragraphs describe some examples of derived attributes according to an embodiment. These examples should not be construed as limiting one or more embodiments. Instance model 110 may include many different kinds of derived attributes.

(1) In an embodiment, "success" is a derived attribute that expresses a degree to which a cyber asset achieves the intended effect. Success may have different meanings for different asset types and/or mission phases. For a cyber asset used during the reconnaissance phase of a cyber mission, success may mean that the asset generates an accurate and precise picture of the target environment. For a cyber asset used during a later exploitation phase, success may be characterized by the asset's ability to deny service to a specific target component for an extended period of time.

(2) In an embodiment, "speed" is a derived attribute that expresses latency associated with executing the cyber asset, i.e., the timeliness of asset impact. Evaluating a cyber asset's speed may assist in the selection of a suitable cyber asset given current mission timelines.

(3) Deploying a cyber asset may generate signals that allow an adversary to detect the asset's presence. In an embodiment, "detectability" is a derived attribute that expresses a likelihood that a cyber asset, if deployed, will be detected. Detectability may be separated into real-time detectability and forensic detectability. Real-time detectability expresses a degree to which the asset can be detected during execution. Forensic detectability expresses a degree to which the asset can be detected during forensic analysis after execution.

(4) In an embodiment, "attribution" is a derived attribute that expresses a degree to which the asset can be linked to its originator (also referred to as the "asset launcher") after being detected. Attribution may be separated into asset attribution and location attribution. Asset attribution expresses a degree to which the asset launcher can be identified based on characteristics/uniqueness of the asset itself. Location attribution expresses a degree to which the asset launcher can be identified based on the originating ("asset launch") location.

(5) In an embodiment, "collateral damage" is a derived attribute that expresses a degree to which unintended target components are effected, i.e., the potential for unintended interaction effects caused by executing the cyber asset in the target environment.

(6) In an embodiment, "adaptability" is a derived attribute that expresses a degree to which a cyber asset can succeed in dynamically changing environments, i.e., the asset's ability to adapt to changing operating conditions.

In an embodiment, an orchestrator 142 orchestrates operations of semantic transformers 138. Orchestrator 142 uses configuration data 140, which may be supplied by one or more SME's and/or one or more automated processes, to determine the ordering of semantic transformers 138 and/or dependencies between different semantic transformers 138. Configuration data 140 may also support customization of different implementations of the same semantic transformer 138 and/or different implementations of derived attributes (e.g., depending on the particular cyber asset under consideration). For example, different implementations of the derived "success" attribute may apply to different types of cyber assets. Semantic transformers 138 may operate as 'plug-ins' to instance model generator 108, such that different semantic transformers 138 may be added, removed, and/or reconfigured as needed. System 100 may thus provide the flexibility to evaluate many different types of cyber assets under many different conditions, including cyber assets and/or conditions that may not have been supported by an initial configuration of instance model generator 108.

2.3. Query Processing Pipeline

Returning to FIG. 1A, in an embodiment, query processing pipeline 114 refers to a logical pipeline of hardware and/or software components configured to perform operations described herein for generating a cyber asset prediction 124 responsive to a query 116. Examples of operations for generating cyber asset prediction 124 are described below.

In an embodiment, query processing pipeline 114 uses one or more Multi-Entity Bayesian Networks (MEBN's) to generate cyber asset prediction 124. Bayesian Networks are limited to propositional logic and may therefore be inadequate for capturing the complexity involved in cyber asset planning. A probabilistic ontology is able to capture additional complexity. One or more embodiments use PR-OWL, which is a probabilistic extension to the W3C Web Ontology Language (OWL). MEBN's are a mathematical foundation of PR-OWL and can be seen as a first-order logic version of Bayesian Networks.

Specifically, in an embodiment, a library of knowledge fragments 132 represents knowledge about relationships between entities in the cyber impact ontology 112. Knowledge fragments 132 encode probabilistic information about a repeatable event or pattern (e.g., the effect of a specific cyber asset on a network node). For example, knowledge fragments 132 may include a library of MEBN Fragments (MFrags). MFrags are parametrized fragments of a directed graphical probability model. Specifically, MFrags represent probabilistic relationships among uncertain attributes of domain entities and relationships among domain entities. MFrags may be seen as templates that can be instantiated to form a joint probability distribution involving multiple random variables. (As used herein, the term "random variable" has the meaning that is typically understood in the areas of probability and statistics.) A set of MFrags that collectively satisfies constraints, ensuring a unique joint probability distribution, is an MEBN Theory (MTheory). An MFrag may be instantiated as many times as needed to match a specific situation (e.g. a specific cyber asset being deployed to a ten-node network). As discussed in further detail below, model generator 118 may use different combinations of knowledge fragments 132 to generate situation-specific models 120.

In an embodiment, query processing pipeline 114 is configured to receive query 116, defining a set of one or more criteria (also referred to as constraints) for cyber asset prediction 124. For example, query 116 may indicate a particular cyber asset and one or more properties of a target system in which the cyber asset is to be deployed. Query processing pipeline 114 may receive query 116 as user input, for example, via user interface 128. Query 116 may take many different forms. In an embodiment, query 116 is a set of multiple queries. For example, query 116 may include a set of SPARQL queries. Query processing pipeline 114 may require query 116 to be in a format that is compatible with parsing functionality of logical and probabilistic components of query processing pipeline 114.

In an embodiment, model generator 118 refers to hardware and/or software configured to perform operations described herein for generating a situation-specific model 120. Model generator 118 may be configured to generate situation-specific model 120 responsive to query 116, using instance model 110 and knowledge fragments 132. Specifically, model generator 118 may be configured to parse query 116 and determine which knowledge fragments 132 (i.e., all of the knowledge fragments 132 or a subset thereof) are needed to satisfy the constraints imposed by query 116. In an embodiment using SPARQL and MEBN's, based on the SPARQL query set received, model generator 118 requests metadata of corresponding experiments and uses the metadata to define (a) which MFrags to instantiate and (b) how many times to instantiate each MFrag. For example, if an experiment produced metadata indicating that the experimental network size was between 10-50 computers, model generator 118 may use only the knowledge fragments 132 with context nodes matching that size criterion. While metadata from a particular experiment may be requested only once for a query set, a corresponding MFrag may be instantiated multiple times.

In an embodiment, if the necessary knowledge fragments 132 are not available, model generator 118 may be unable to proceed without additional experimental data. Model generator 118 may be configured to obtain additional experimental data as described below. If the necessary knowledge fragments 132 are available, then model generator 118 may be configured to generate situation-specific model 120 using the relevant knowledge fragments 132. In an embodiment, model generator 118 instantiates MFrags corresponding to the constraints of query 116 and generates a situation-specific MEBN (SSBN) using the instantiated MFrags. For example, model generator 118 may be configured to construct SSBN's using a construction algorithm implemented using the open source software UnBBayes.

In an embodiment, situation-specific model 120 includes the prior knowledge associated with the specific constraints defined by query 116. In an embodiment using SSBN's, probability information stored in the resident nodes of the MFrags being instantiated dictates the conditional probability tables (CPT's) of the resulting SSBN. The specific configuration of the SSBN is influenced by both the constraints imposed by query 116 and the data used to build instance model 110. Query 116 conveys what information needs to be 'learned,' i.e., automatically derived responsive to query 116, while the underlying data supplies the substantive contents of the SSBN.

In an embodiment, situation-specific model 120 includes or otherwise produces cyber asset prediction 124, as an answer to query 116. Cyber asset prediction 124 corresponds to a predicted outcome of deploying a cyber asset, which may not correspond directly to any particular experiment conducted in experimental environment 104. Even though the specific situation to which query 116 is directed may never have been addressed by any experiments, situation-specific model 120 may nonetheless integrate available information to predict an outcome for that specific situation.

In an embodiment, MEBNs provide a compact way to represent repeated structures in a Bayesian Network. MEBN's do not impose a fixed limit on the number of random variable instances, which may be dynamically generated as needed. Because MEBN's may be used to form a consistent composition of parametrized model fragments, they may be well-suited for solving HLIF problems. MEBN inference may be performed by instantiating relevant MFrags and assembling them into SSBNs to reason about a given situation. New data may be fused into an SSBN to provide updated hypotheses with associated levels of confidence. In an embodiment, these features support the representation of diverse information coming from various sources, making MEBN's a viable logical basis for probabilistic ontologies.

In an embodiment, cyber asset prediction 124 includes information responsive to query 116, which may be based on one or more derived attributes of the cyber asset(s) being evaluated. For example, cyber asset prediction 124 may indicate the value(s) of one or more derived attributes, such as the likelihood of success if the cyber asset is deployed in conditions similar or identical to constraints imposed by query 116. For example, cyber asset prediction 124 may assign ranks or grades to one or more cyber assets, based on one or more derived attributes. Cyber asset prediction 124 may include a recommendation applicable to the cyber asset (e.g., deploy or do not deploy, which of multiple cyber asset options to select, and/or one or more configuration settings to use) based on one or more derived attributes. Cyber asset prediction 124 may include many different kinds of information.

In an embodiment, reporting engine 126 refers to hardware and/or software configured to perform operations described herein for generating a report of cyber asset prediction 124. Specifically, reporting engine 126 may be configured to report information describing cyber asset prediction 124 in a document and/or user interface (e.g., user interface 128). A report of cyber asset prediction 124 may take many different forms, including but not limited to a Portable Document Format (PDF) file, a Microsoft® Word document, a web page, a text message, a log file, a screen in a stand-alone software application, or another format or combination thereof.

In an embodiment, one or more components of system 100 may be configured to store data (e.g., raw data 106, instance model 110, cyber impact ontology 112, query 116, situation-specific model 120, and/or cyber asset prediction 124) in data repository 104, and/or retrieve data from data repository 104. In an embodiment, data repository 104 is any type of storage unit and/or device (e.g., a file system, database, collection of tables, or any other storage mechanism) for storing data. Data repository 104 may include multiple different storage units and/or devices. The multiple different storage units and/or devices may or may not be of the same type or located at the same physical site. Further, data repository 104 may be implemented or may execute on the same computing system as one or more other components of system 100. Alternatively or additionally, data repository 104 may be implemented or executed on a computing system separate from one or more other components of system 100. Data repository 104 may be logically integrated with one or more other components of system 100. Alternatively or additionally, data repository 104 may be communicatively coupled to one or more other components of system 100 via a direct connection or via a network. Alternatively, some or all of this information may be implemented and/or distributed across any of the components of system 100.

In an embodiment, one or more components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. EVALUATING A CYBER ASSET

Figure 2:
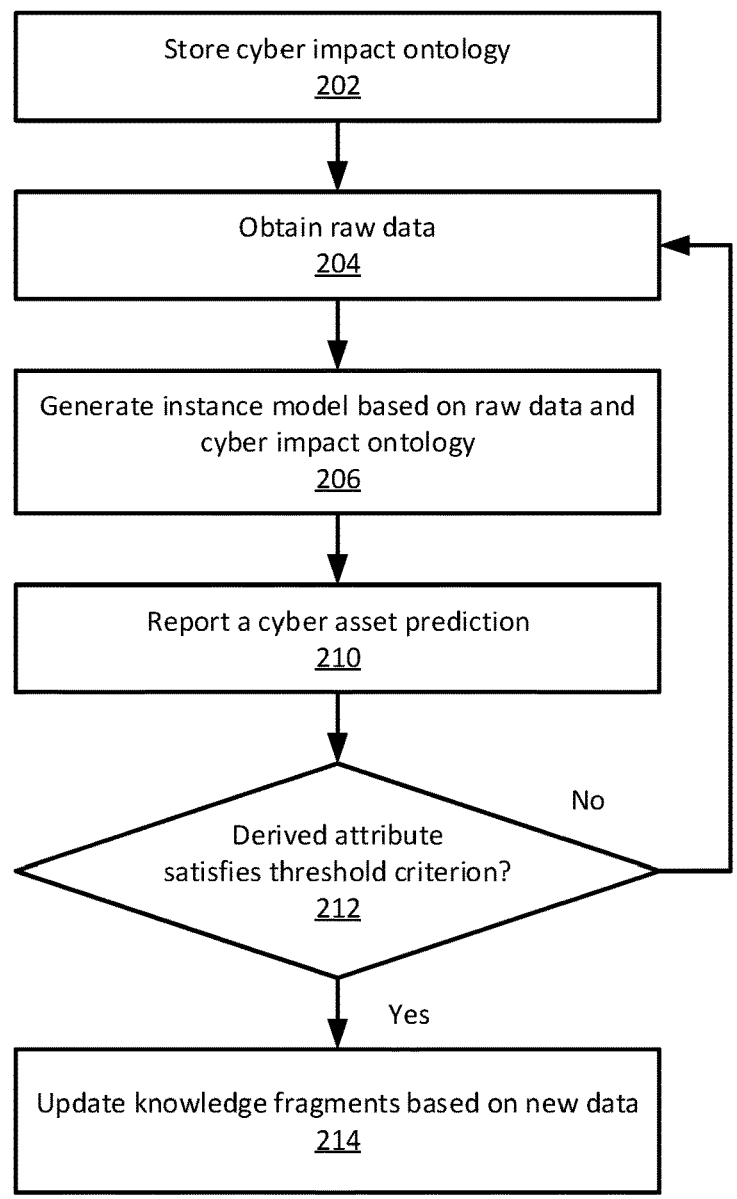
FIG. 2 is a flow diagram of an example of operations for evaluating a cyber asset according to an embodiment.

FIG. 2 is a flow diagram of an example of operations for evaluating a cyber asset according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a cyber asset evaluation system (e.g., one or more components of system 100 discussed above) stores a cyber impact ontology (Operation 202). As discussed herein, the cyber impact ontology provides an ontological framework for evaluating one or more cyber assets.

In an embodiment, the system obtains raw data (Operation 204). As described above, the raw data may include 'live' data from a target environment and/or experimental data from a test environment. In an embodiment, the system generates an instance model based on the raw data (Operation 206). As described above, the instance model may also be based, in part, on human-generated data. The instance model may include one or more derived attributes. Specifically, as a result of the semantic processing described herein, the instance model may include an attribute that is not represented directly in the raw data, but can be derived based on the available data. In an embodiment, the system reports a cyber asset prediction (Operation 210). The cyber asset prediction indicates a predicted outcome of deploying a cyber asset in a target environment. The report may include a derived attribute and/or other information based on a derived attribute.

In an embodiment, the system determines whether a derived attribute satisfies a threshold criterion (Operation 212). For example, the threshold criterion may indicate a minimum degree of confidence in the derived attribute and/or a maximum margin of error associated with the derived attribute. If the derived attribute does not satisfy the threshold criterion, then the system may obtain additional raw data (Operation 204) to supplement the data that was previously used. To obtain additional raw data, the system may recommend and/or perform additional experiments (with or without human guidance) to obtain additional experimental data designed to increase the degree of confidence in the derived attribute and/or decrease the margin of error associated with the derived attribute. In an embodiment, the system thus supports an iterative process of refinement that improves the accuracy and reliability of cyber asset evaluations over time.

In an embodiment, the system updates knowledge fragments (e.g., MFrags) based on new data (Operation 214). The system may receive new data at various points in the cyber asset evaluation process. As one example, as described above, the system may obtain additional data to improve performance relative to one or more threshold criteria. As another example, as described below, the system may perform additional experiments to obtain experimental data needed to satisfy a query. To incorporate additional data, the system may generate a new knowledge fragment and/or update an existing knowledge fragment, which may be a knowledge fragment that was instantiated during the evaluation process. In an embodiment, the system thus includes a feedback mechanism that updates the knowledge fragments as new data become available, improving the accuracy and reliability of cyber asset evaluations over time.

4. GENERATING A SITUATION-SPECIFIC MODEL

Figure 3:
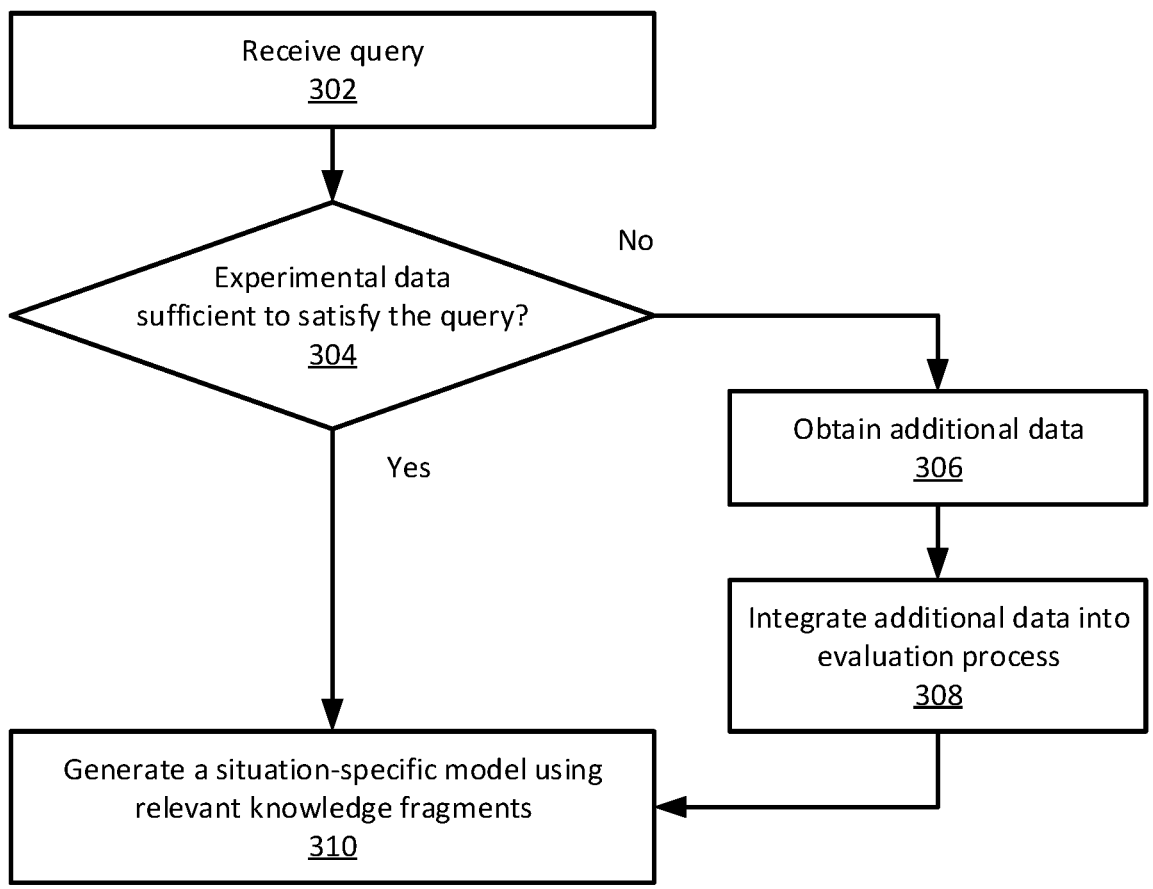
FIG. 3 is a flow diagram of an example of operations for deriving an aggregate attribute of a cyber asset according to an embodiment.

FIG. 3 is a flow diagram of an example of operations for generating a situation-specific model according to an embodiment. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a cyber asset evaluation system (e.g., one or more components of system 100 illustrated in FIG. 1A) receives a query (Operation 302). As described above, the query includes one or more criteria for evaluating a cyber asset. In an embodiment, after receiving a query, the system determines whether the currently available experimental data is sufficient to satisfy the query (Operation 304). The currently available experimental data may be insufficient, for example, if it lacks data corresponding to a constraint specified in the query. If the experimental data is insufficient to satisfy the query, then the system may obtain additional data (Operation 306) to supplement the existing data. To obtain additional data, the system may recommend and/or perform additional experiments (with or without human guidance) directed to the constraints specified by the query. For example, if the query is constrained to a target environment with fifty nodes and the available data is for experimental systems with no more than twenty nodes, one or more additional experiments may be performed with fifty or more nodes.

In an embodiment, the system integrates the additional data into the evaluation process (Operation 308). In an embodiment using SSBN's, the system may invoke a Bayesian parameter learning module that receives both the current SSBN and the results of the new experiments, and computes the posterior probabilities through parameter learning. The resulting SSBN may have the same structure as the original SSBN, but with a new joint probability distribution reflecting the learned data. One or more embodiments may support regular and/or incremental parameter learning, one or the other of which may be chosen based on system design details. As described above, the system may subsequently generate and/or update one or more knowledge fragments to incorporate the additional experimental data into future evaluations.

In an embodiment, the system generates a situation-specific model using relevant knowledge fragments (Operation 310). The system may generate a situation-specific model and update the model based on additional experimental data, as described above. Alternatively, the system may not generate a situation-specific model until the experimental data includes all the necessary information.

5. ADDITIONAL EXAMPLES

Detailed examples are described below for purposes of clarity. Components and/or operations described below should be understood as examples that may not be applicable to one or more embodiments. Accordingly, components and/or operations described below should not be construed as limiting the scope of one or more embodiments.

5.1. Semantic Processing Pipeline

Figure 4:
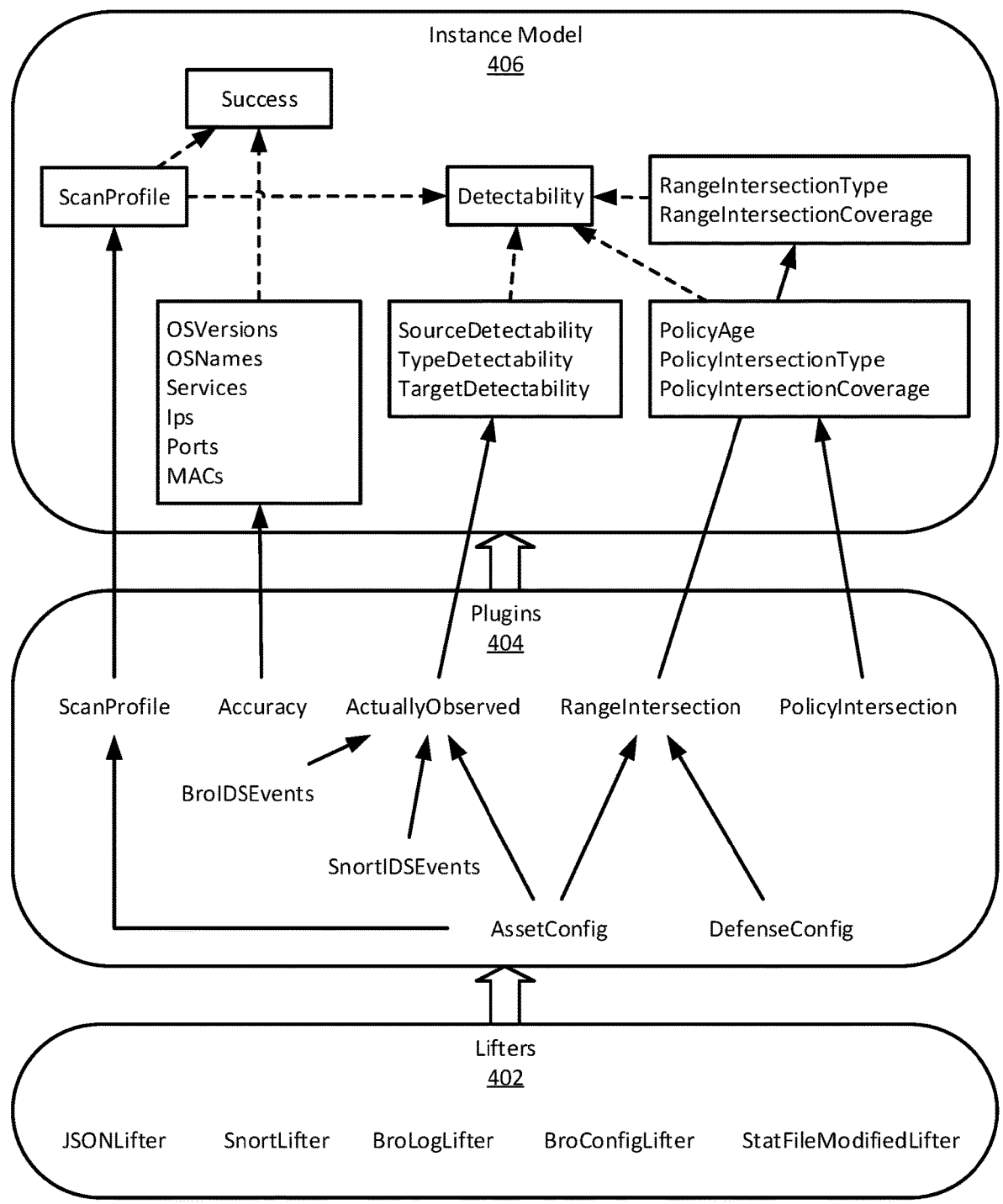
FIG. 4 is a block diagram of an example of a semantic processing pipeline according to an embodiment.

FIG. 4 is a block diagram of an example of a semantic processing pipeline according to an embodiment. Specifically, the example semantic processing pipeline of FIG. 4 supports quantification of "success" and "detectability" as derived aggregate attributes. In this example, lifters 402 are implementation classes that parse raw data into semantic triples. The prefixes "Snort" and "Bro" refer to intrusion detection systems that produce raw data from corresponding sensors. Plugins 404 are implementation classes that build up abstractions of a cyber impact ontology and capture the resulting knowledge in the form of one or more instance models 406. As illustrated in FIG. 4, instance model 406 includes one or more derived aggregate attributes, which in this example are the derived "success" and "detectability" attributes.

5.2. Knowledge Fragment

Figure 5:
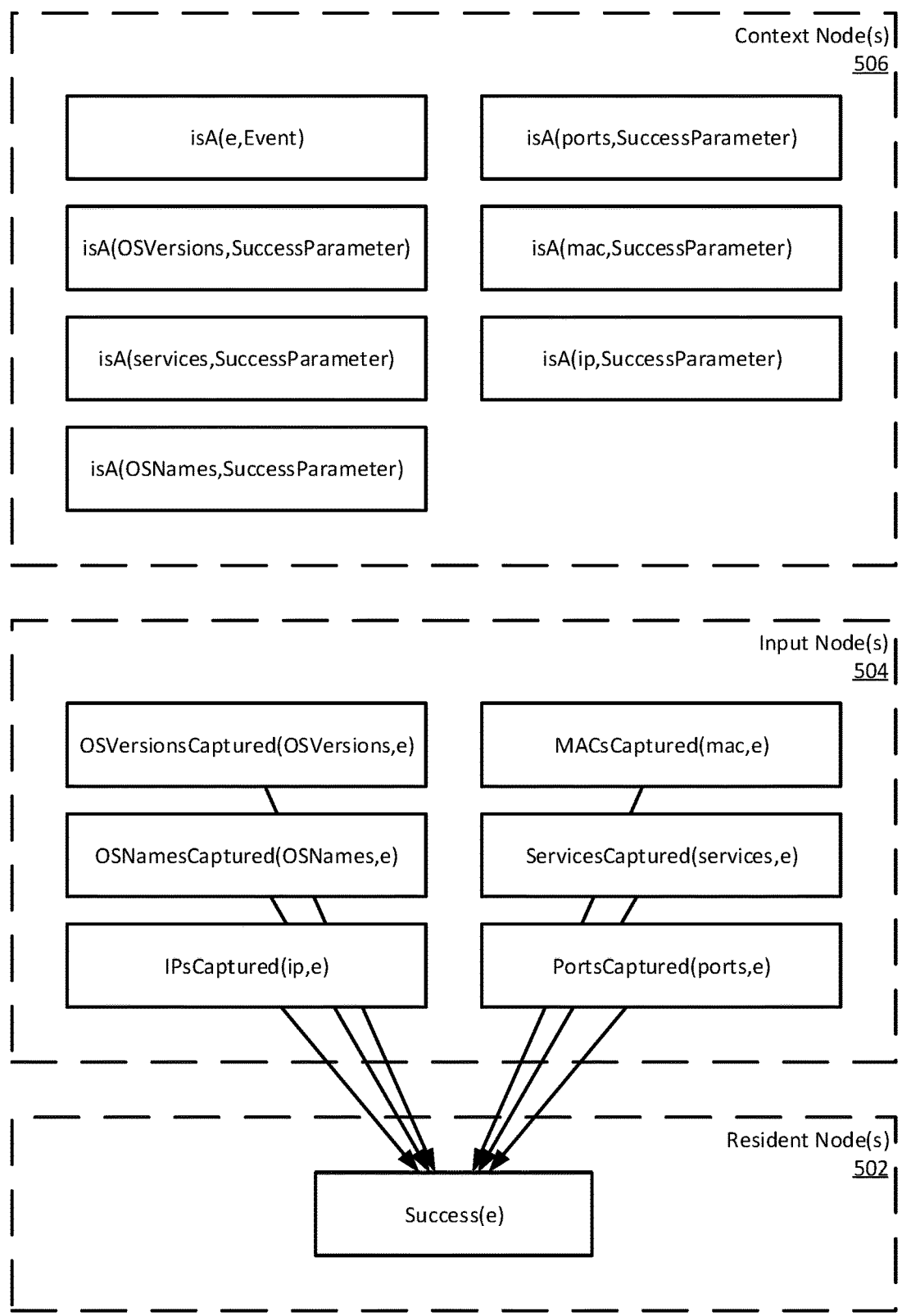
FIG. 5 is a block diagram of an example of a knowledge fragment according to an embodiment.

FIG. 5 is a block diagram of an example of a knowledge fragment according to an embodiment. Specifically, the example in FIG. 5 is a simplified version of a "Success"

Mfrag that is part of a library of MFrags in a cyber effects ontology. The MFrag illustrated in FIG. 5 represents concepts and relationships that may be used to infer/predict the level of success of a specific cyber event (e.g. an asset execution event), based on the specific conditions (not shown) of that event. Three types of MFrag nodes are illustrated in FIG. 5: context nodes 506, input nodes 504, and resident nodes 502.

In an embodiment, resident nodes 502 are random variables that form the core subject of an MFrag. The MFrag defines a local distribution for each resident node 502 as a function of the combination of the states of its parents in the fragment graph. Resident nodes 502 may be discrete or continuous. In an embodiment, distributions of both continuous and discrete resident nodes are defined in the MFrag to which they are resident. In this example, there is one discreet resident node 502. Specifically, the discrete resident node "Success(e)" is a Boolean (i.e., true or false) random variable that conveys the probability of success for event e.

In an embodiment, input nodes 504 serve as 'pointers' that reference resident nodes in other MFrags (not shown). Input nodes 504 influence the local distributions of resident nodes 502, but their own distributions are defined in the MFrags in which they are resident. In the example illustrated in FIG. 5, input node "IPsCaptured(ip,e)" is a resident node in the "IPresults" MFrag (not shown), which conveys the distribution of IP addresses captured in event e, as well as its relationship with other nodes in that MFrag.

In an embodiment, context nodes 506 are Boolean random variables representing conditions that must be satisfied for the probability distribution of the resident node in an MFrag to apply. Similar to input nodes 504, context nodes 506 have distributions defined in their respective resident MFrags.

In an embodiment, by allowing uncertainty on context nodes 506, MEBNs may represent several types of sophisticated uncertainty patterns, such as relational uncertainty or existence uncertainty. These representations may help facilitate HLIF within complex domains such as estimation of impact of cyber assets, where it is not always possible to know whether a given result refers to each specific node in the network. As discussed above, one or more embodiments integrate SME-provided knowledge with results from experiments. This integration may help leverage the representational capabilities of MEBN and/or other techniques for modeling cyber effects ontologies.

5.3. Situation-Specific Models

Figure 6:
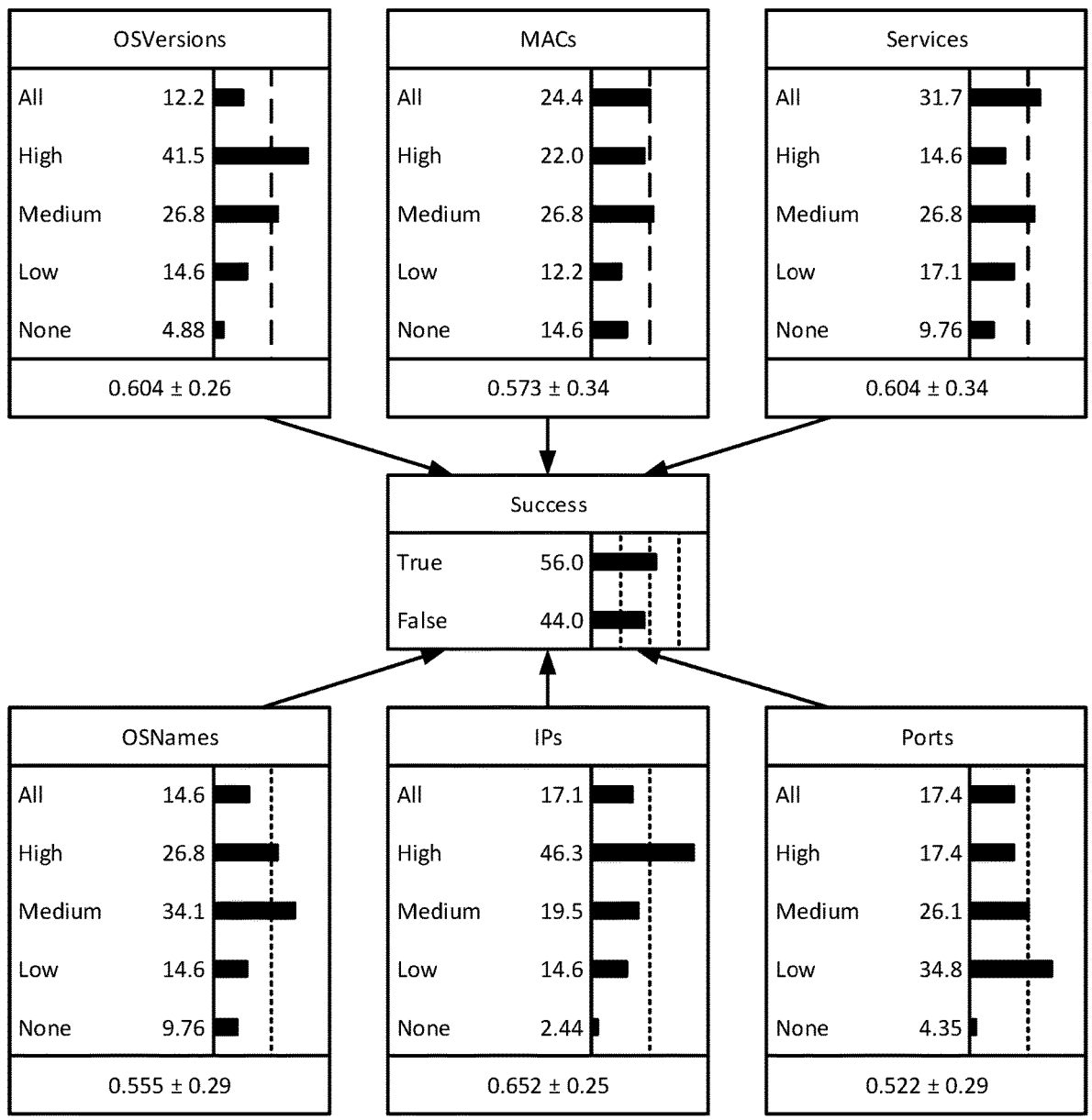
FIGS. 6 and 7 illustrate examples of situation-specific models according to an embodiment.
Figure 7:
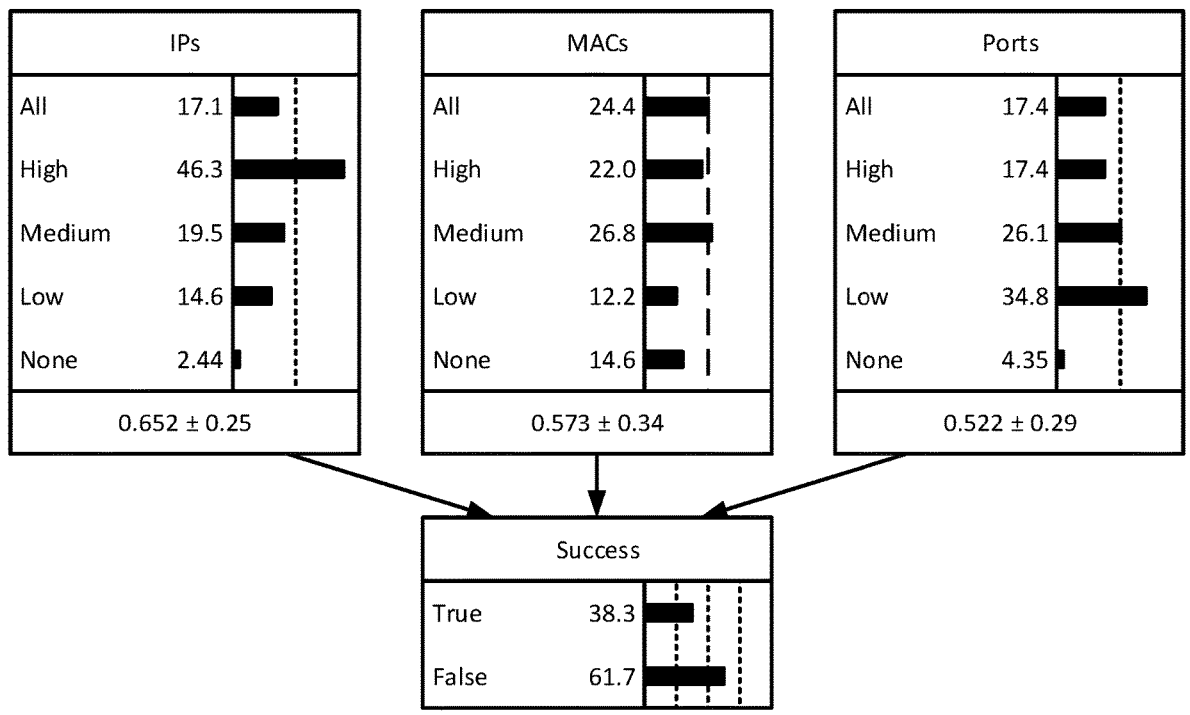

FIGS. 6 and 7 illustrate examples of situation-specific models according to an embodiment. Specifically, FIGS. 6 and 7 illustrate how a system may use the same cyber effects ontology to produce different situation-specific models for different queries. In FIG. 6, the situation-specific model is based on a query (not shown) for an attack event a in which all six of the illustrated criteria are important. The query includes criteria that define all six criteria as important for evaluating the cyber asset. The resident nodes to which the input nodes of the "Success" MFrag were pointing have been instantiated from their respective resident MFrags and built into the situation-specific model.

In FIG. 7, the situation-specific model is based on a query (not shown) for another event ft in which only three of the criteria are important. The query includes criteria that define those three criteria as important for evaluating the cyber asset. Only the resident nodes to which the three corresponding input nodes were pointing have been instantiated and built into the situation-specific model. In this manner, the situation-specific models illustrated in FIGS. 6 and 7 each are tailored for the conditions of the specific events in question, responsive to the respective queries.

6. COMPUTER IMPLEMENTATIONS

Processes described above are merely illustrative embodiments of systems that may be used to execute security operations. Such illustrative embodiments are not intended to limit the scope of the present invention, as any of numerous other implementations exist for performing the invention. None of the claims set forth below are intended to be limited to any particular implementation of protecting service-level entities in a distributed computer system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C #, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate extending offers to users and redeeming offers according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Oracle Corporation, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C #(C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 8:
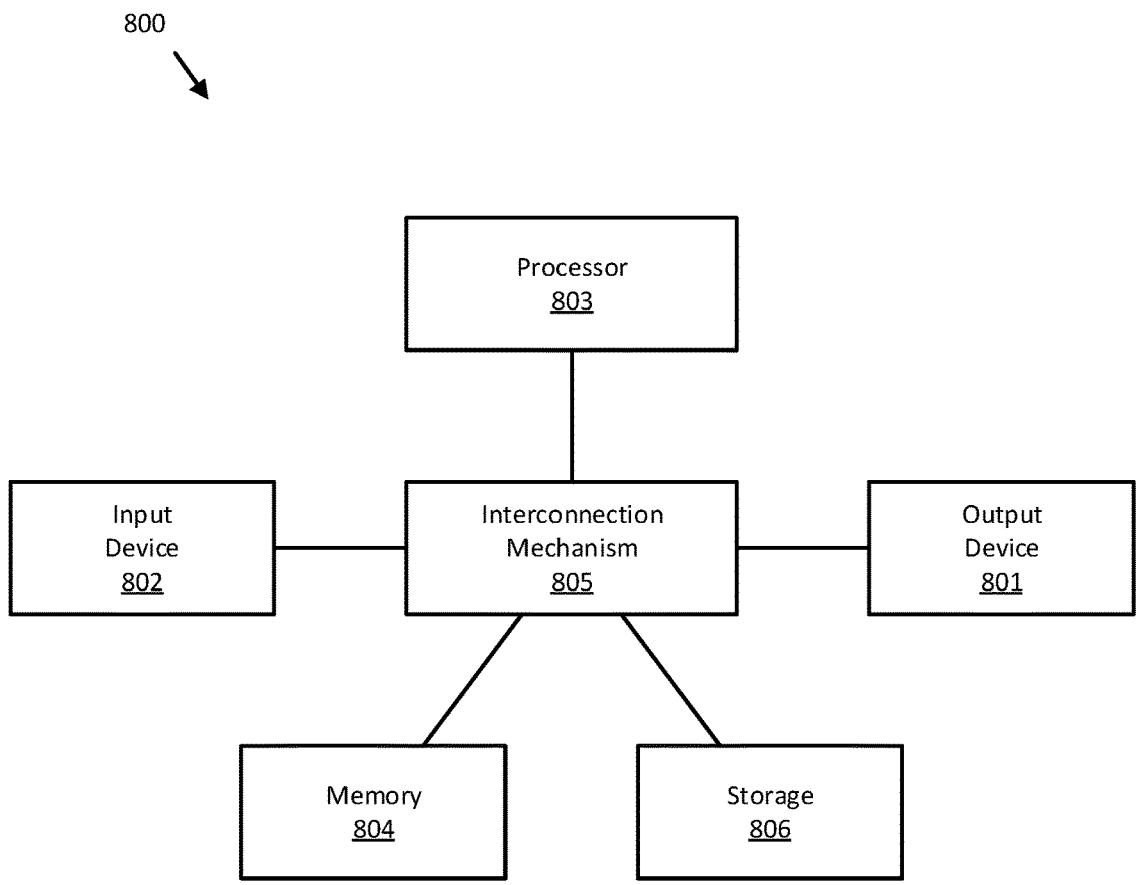
FIG. 8 is a block diagram of an example of a computer system according to an embodiment.
Figure 9:
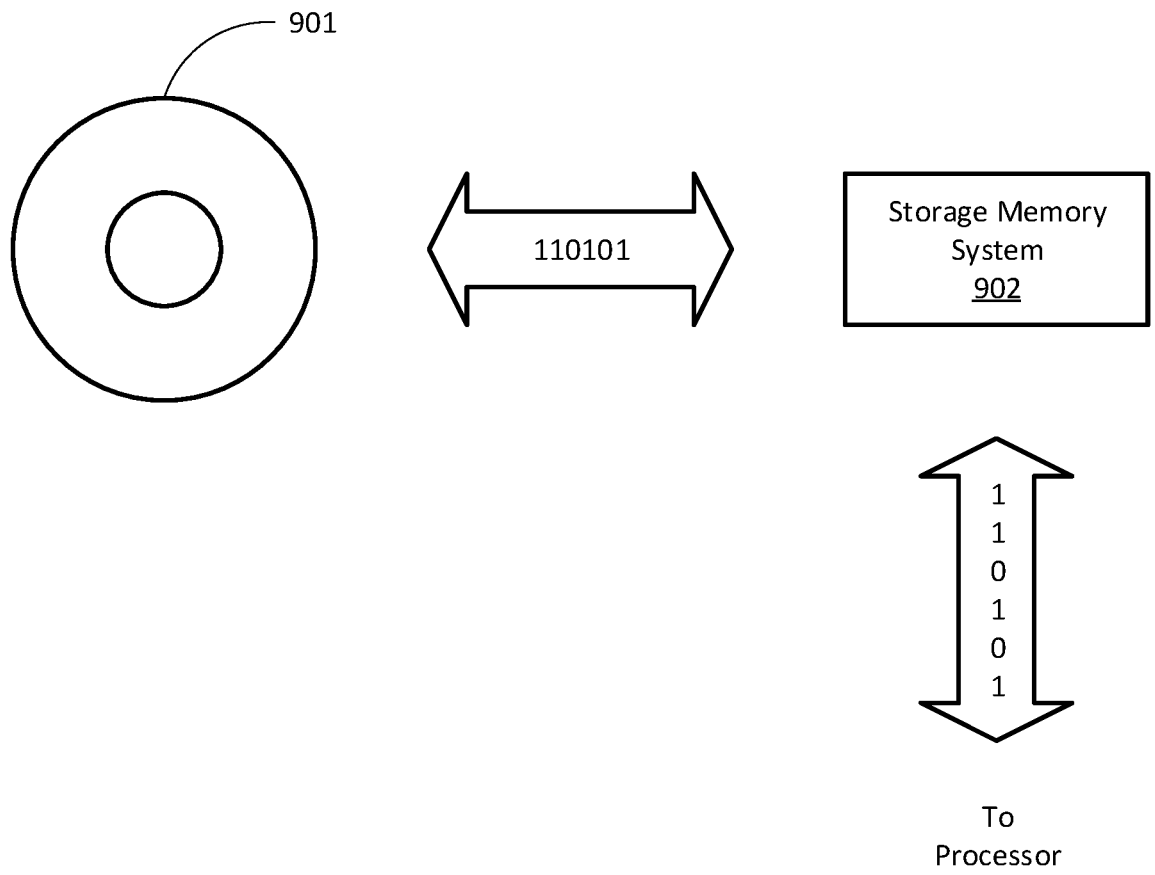
FIG. 9 is a block diagram of an example of a storage system according to an embodiment.

Any number of components of system 100 may be implemented on a computer system described below in relation to FIGS. 8 and 9. In particular, FIG. 8 shows an example computer system 800 used to implement various aspects. FIG. 9 shows an example storage system that may be used.

System 800 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments of the invention. Further, the software design system may be located on a single computer or may be distributed among a plurality of computers attached by a communications network.

For example, various aspects of the invention may be implemented as specialized software executing in a general-purpose computer system 800 such as that shown in FIG. 8. The computer system 800 may include a processor 803 connected to one or more memory devices 804, such as a disk drive, memory, or other device for storing data. Memory 804 is typically used for storing programs and data during operation of the computer system 800. Components of computer system 800 may be coupled by an interconnection mechanism 805, which may include one or more busses (e.g., between components that are integrated within a same machine) and/or a network (e.g., between components that reside on separate discrete machines). The interconnection mechanism 805 enables communications (e.g., data, instructions) to be exchanged between system components of system 800. Computer system 800 also includes one or more input devices 802, for example, a keyboard, mouse, trackball, microphone, touch screen, and one or more output devices 801, for example, a printing device, display screen, and/or speaker. In addition, computer system 800 may contain one or more interfaces (not shown) that connect computer system 800 to a communication network (in addition or as an alternative to the interconnection mechanism 805).

The storage system 806, shown in greater detail in FIG. 9, typically includes a computer readable and writeable nonvolatile recording medium 901 in which signals are stored that define a program to be executed by the processor or information stored on or in the medium 901 to be processed by the program. The medium may, for example, be a disk or flash memory. Typically, in operation, the processor causes data to be read from the nonvolatile recording medium 901 into another memory 902 that allows for faster access to the information by the processor than does the medium 901. This memory 902 is typically a volatile, random access memory such as a dynamic random-access memory (DRAM) or static memory (SRAM). It may be located in storage system 806, as shown, or in memory system 804, not shown. The processor 803 generally manipulates the data within the integrated circuit memory 804, 902 and then copies the data to the medium 901 after processing is completed. A variety of mechanisms are known for managing data movement between the medium 901 and the integrated circuit memory element 804, 902, and the invention is not limited thereto. The invention is not limited to a particular memory system 804 or storage system 806.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 may be also implemented using specially programmed, special purpose hardware. In computer system 800, processor 803 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C #(C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com (Seattle, WA), among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of evaluating cyber assets, comprising:
obtaining, from a plurality of data sources in an experimental simulation environment, raw data generated in response to execution of a cyber asset configured to assess target nodes;
receiving, from a user, a query including one or more constraints;
generating, from the raw data and the one or more constraints, at least one situation-specific instance model corresponding to the respective plurality of data sources, the at least one situation-specific instance model comprising a plurality of instances of concepts represented in a cyber impact ontology;
wherein generating the at least one situation-specific instance model comprises executing a plurality of semantic transformers, wherein at least one semantic transformer in the plurality of semantic transformers is configured as a removable plug-in;
wherein the at least one situation-specific instance model comprises at least one derived aggregate attribute, the at least one derived aggregate attribute being selected from a group consisting of a success attribute, a collateral damage attribute, a speed attribute, and an adaptability attribute;
wherein the success attribute expresses a degree to which the cyber asset achieves an intended effect;
wherein the collateral damage attribute expresses a degree to which unintended target components are effected;
wherein the speed attribute expresses a latency associated with executing the cyber asset, including a timeliness of asset impact; and
wherein the adaptability attribute expresses a degree to which the cyber asset can succeed in dynamically changing environments, including the cyber asset's ability to adapt to changing operating conditions; and
generating, as a response to the query and based on the at least one situation-specific instance model, a predicted outcome including a recommendation including one or more configuration settings that maximize the effectiveness of the cyber asset.

2. The method of claim 1, wherein the plurality of data sources comprises a network sensor.

3. The method of claim 1, wherein the at least one derived aggregate attribute is selected from the group also consisting of a detectability attribute.

4. The method of claim 1, wherein the at least one situation-specific instance model comprises a plurality of semantic graphs.

5. The method of claim 1, wherein the experimental environment comprises one or more experimental components configured to emulate one or more components of a target system.

6. A computer system comprising:
an experimental simulation environment comprising a plurality of data sources;
a cyber asset configured to be executed by the computer system to assess target nodes;
a processor; and
a memory configured to store instructions that when executed by the processor cause the processor to:
obtain, from a plurality of data sources in the experimental simulation environment, raw data generated in response to execution of the cyber asset;
receive, from a user, a query including one or more constraints;
generate, from the raw data and the one or more constraints, at least one situation-specific instance model corresponding to the respective plurality of data sources, the at least one situation-specific instance model comprising a plurality of instances of concepts represented in a cyber impact ontology;
wherein generating the at least one situation-specific instance model comprises executing a plurality of semantic transformers, wherein at least one semantic transformer in the plurality of semantic transformers is configured as a removable plug-in;
wherein the at least one situation-specific instance model comprises at least one derived aggregate attribute, the at least one derived aggregate attribute being selected from a group consisting of a success attribute, an attribution attribute, a collateral damage attribute, a speed attribute, and an adaptability attribute;
wherein the success attribute expresses a degree to which the cyber asset achieves an intended effect;
wherein the collateral damage attribute expresses a degree to which unintended target components are effected;
wherein the speed attribute expresses a latency associated with executing the cyber asset, including a timeliness of asset impact; and
wherein the adaptability attribute expresses a degree to which the cyber asset can succeed in dynamically changing environments, including the cyber asset's ability to adapt to changing operating conditions; and
generate, as a response to the query and based on the at least one situation-specific instance model, a predicted outcome including a recommendation including one or more configuration settings that maximize the effectiveness of the cyber asset.

7. The computer system of claim 6, wherein the plurality of data sources comprises a network sensor.

8. The computer system of claim 6, wherein the at least one derived aggregate attribute is selected from the group also consisting of a detectability attribute.

9. The computer system of claim 6, wherein the at least one situation-specific instance model comprises a plurality of semantic graphs.

10. The computer system of claim 6, wherein the experimental environment comprises one or more experimental components configured to emulate one or more components a target system.

11. One or more non-transitory computer-readable media storing sequences of for evaluating cyber assets, the sequences of instructions including computer executable instructions that instruct at least one processor to:
obtaining, from a plurality of data sources in an experimental simulation environment, raw data generated in response to execution of a cyber asset configured to assess target nodes;
receiving, from a user, a query including one or more constraints;
generating, from the raw data and the one or more constraints, at least one situation-specific instance model corresponding to the respective plurality of data sources, the at least one situation-specific instance model comprising a plurality of instances of concepts represented in a cyber impact ontology;

wherein generating the at least one situation-specific instance model comprises executing a plurality of semantic transformers, wherein at least one semantic transformer in the plurality of semantic transformers is configured as a removable plug-in;

wherein the at least one situation-specific instance model comprises at least one derived aggregate attribute, the at least one derived aggregate attribute being selected from a group consisting of a success attribute, a collateral damage attribute, a speed attribute, and an adaptability attribute;

wherein the success attribute expresses a degree to which the cyber asset achieves an intended effect;

wherein the collateral damage attribute expresses a degree to which unintended target components are effected;

wherein the speed attribute expresses a latency associated with executing the cyber asset, including a timeliness of asset impact; and wherein the adaptability attribute expresses a degree to which the cyber asset can succeed in dynamically changing environments, including the cyber asset's ability to adapt to changing operating conditions; and generating, as a response to the query and based on the at least one situation-specific instance model, a predicted outcome including a recommendation including one or more configuration settings that maximize the effectiveness of the cyber asset.

12. The one or more media of claim 11, wherein the plurality of data sources comprises a network sensor.

13. The one or more media of claim 11, wherein the at least one derived aggregate attribute is selected from the group also consisting of a detectability attribute.

14. The one or more media of claim 11, wherein the at least one situation-specific instance model comprises a plurality of semantic graphs.

* * * * *